United States Patent
Hommes et al.

(10) Patent No.: US 7,562,652 B2
(45) Date of Patent: Jul. 21, 2009

(54) ENGINE PCV SYSTEM WITH HYDROPHOBIC, OLEOPHOBIC MEMBRANE FOR AIR/OIL SEPARATION

(75) Inventors: Daniel J. Hommes, Shelby Township, MI (US); Thomas A. Spix, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 164 days.

(21) Appl. No.: 11/684,894

(22) Filed: Mar. 12, 2007

(65) Prior Publication Data
US 2008/0223347 A1    Sep. 18, 2008

(51) Int. Cl.
  *F02M 25/00*    (2006.01)
(52) U.S. Cl. .................................................. 123/572
(58) Field of Classification Search ......... 123/572–574, 123/41.86
See application file for complete search history.

(56) References Cited

U.S. PATENT DOCUMENTS

| | | | | |
|---|---|---|---|---|
| 3,137,284 A | * | 6/1964 | Hultgren | 123/572 |
| 4,136,650 A | * | 1/1979 | Manookian, Jr. | 123/573 |
| 4,515,137 A | * | 5/1985 | Manolis | 123/572 |
| 4,920,930 A | * | 5/1990 | Sakano et al. | 123/41.86 |
| 5,024,203 A | * | 6/1991 | Hill | 123/573 |
| 5,586,996 A | * | 12/1996 | Manookian, Jr. | 55/321 |
| 6,167,874 B1 | * | 1/2001 | Becker et al. | 123/572 |
| 6,672,294 B1 | * | 1/2004 | Pirone | 123/572 |
| 2003/0024512 A1 | * | 2/2003 | Kitano et al. | 123/572 |

* cited by examiner

*Primary Examiner*—M. McMahon

(57) ABSTRACT

An engine crankcase emission control system for an internal combustion engine includes a cylinder air intake system connected to associated engine cylinders. The system also includes an engine crankcase. A crankcase air outlet connects the crankcase to the cylinder air intake system at a location subject to variable intake vacuum pressures to allow crankcase vapors to be drawn into inlet air passing to the cylinders. A hydrophobic, oleophobic membrane covers the crankcase air outlet. The membrane inhibits the passage of oil and water out of the crankcase through the crankcase air outlet.

18 Claims, 2 Drawing Sheets

US 7,562,652 B2

ENGINE PCV SYSTEM WITH HYDROPHOBIC, OLEOPHOBIC MEMBRANE FOR AIR/OIL SEPARATION

TECHNICAL FIELD

This invention relates to internal combustion engine crankcase emission control systems, and more particularly to air/oil separation in crankcase emission control systems.

BACKGROUND OF THE INVENTION

It is known in the art relating to internal combustion engines to use a crankcase emission control system, such as a positive crankcase ventilation (PCV) system, to remove crankcase vapors (including unburned fuel and combustion products that leak past the piston rings, oil vapors, and other vapors present in the crankcase) from the crankcase. To prevent excessive pressure in the crankcase and the buildup of combustion byproducts, PCV systems evacuate the crankcase vapors from the crankcase into the engine cylinder intake air system so that the crankcase vapors are burned in the engine combustion process. It is undesirable for engine oil vapors and droplets to be entrained in the crankcase vapors that are passed to the intake air system. Therefore, many PCV systems include an oil separation system or device to remove entrained oil from the crankcase vapors before the crankcase vapors are burned.

Conventionally, a PCV system will include an oil separator, such as a series of baffles and chambers to change the velocity and direction of crankcase vapors prior to the crankcase vapors being fed to the combustion chambers for burning. The baffle and chamber arrangement causes oil droplets entrained in the crankcase gases to separate out, reducing the amount of engine oil consumed by the engine during combustion. Other oil separator devices have also been utilized.

SUMMARY OF THE INVENTION

The present invention provides a crankcase emission control system for an internal combustion engine that utilizes a hydrophobic, oleophobic membrane to separate oil droplets from the crankcase vapors before the crankcase vapors exit the crankcase. The membrane allows air and other vapors to pass but separates the oil droplets out for return to the crankcase thus reducing oil loss through the crankcase emission control system. The hydrophobic, oleophobic membrane may be used in place of or may supplement conventional air/oil separation arrangements used in crankcase emission control systems such as PCV systems. The membrane is also capable of preventing water vapor from passing, thereby reducing the possibility of throttle body icing that may occur due to cold (i.e., at or below freezing) air intake conditions.

In an exemplary embodiment of the present invention, a crankcase emission control system for an internal combustion engine includes a cylinder air intake system connected to associated engine cylinders, and an engine crankcase. A crankcase air outlet connects the crankcase to the cylinder air intake system at a location subject to variable intake vacuum pressures to allow crankcase blow-by gases and other crankcase vapors (all referred to herein as crankcase vapors) to be drawn into the inlet air passing to the cylinders. A hydrophobic, oleophobic membrane covers the crankcase air outlet to inhibit the passage of oil and water out of the crankcase through the crankcase air outlet. Optionally, the crankcase emission control system may additionally include a separator such as a labyrinth (impact) separator or a cyclone chamber within the crankcase upstream of the crankcase air outlet.

In a further embodiment, the present invention provides an internal combustion engine including a crankcase and at least one cylinder. A cylinder air intake system is in fluid communication with each cylinder. A crankcase air outlet connects the crankcase to the cylinder air intake system to allow crankcase vapors to be drawn into the inlet air passing to the cylinders. A hydrophobic, oleophobic membrane covers the crankcase air outlet. The membrane inhibits the passage of oil and water out of the crankcase through the crankcase air outlet.

These and other features and advantages of the invention will be more fully understood from the following description of certain specific embodiments of the invention taken together with the accompanying drawings.

DESCRIPTION OF AN EXEMPLARY EMBODIMENT

Figure 1:
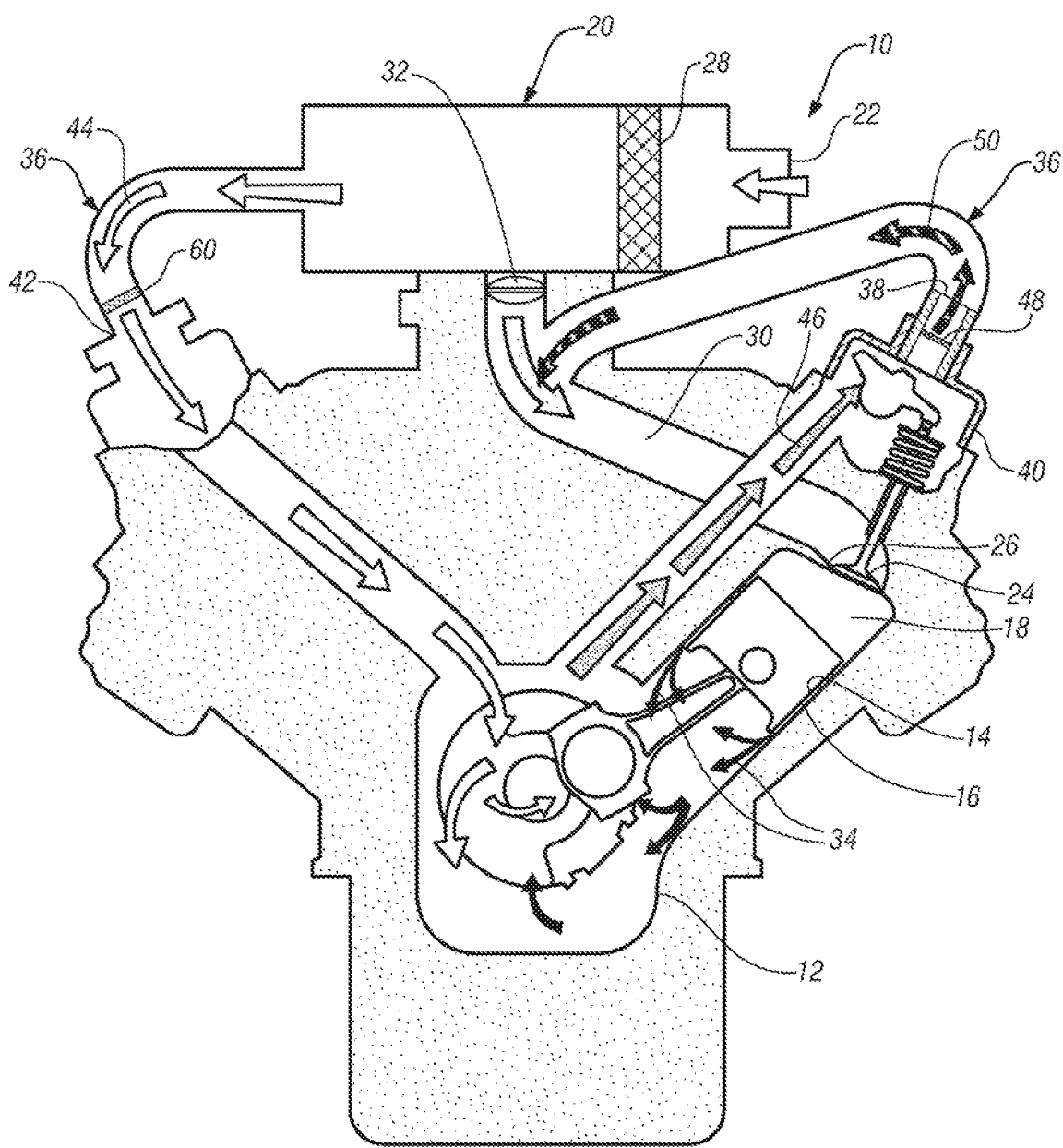
FIG. 1 is a schematic view of an internal combustion engine illustrating a crankcase emission control system including a hydrophobic, oleophobic membrane in accordance with the invention.

Referring now to the drawings in detail, numeral 10 generally indicates an internal combustion engine in accordance with the present invention. The internal combustion engine 10 may generally be either a gasoline engine or a diesel engine. The engine 10 generally includes a crankcase 12 and at least one cylinder 14. A piston 16 is reciprocable in each cylinder 14 and defines a variable volume combustion chamber 18 therein.

A filtered cylinder air intake system 20 is in fluid communication with each combustion chamber 18. The cylinder air intake system 20 generally extends from a fresh air inlet 22 to cylinder intake valves 24 located in cylinder intake ports 26. The cylinder air intake system 20 may include an air filter 28 and an air intake manifold 30. A throttle 32 may also be disposed in the cylinder air intake system 20 for controlling cylinder intake airflow to the associated cylinders 14. The cylinder air intake system 20 may alternatively be referred to as an air induction system.

During engine operation, fresh inlet air enters the combustion chamber 18 via the cylinder air intake system 20 as the intake valves 24 open and close. The fresh inlet air is mixed with fuel to form a combustible mixture that is ignited to drive the piston 16. During the power stroke in which combustion takes place, some of the combustion products and unburned fuel escape into the crankcase 12 past piston rings of the pistons 16 and adjacent walls of the cylinders 14. The gases that escape past the piston rings are generally referred to as crankcase blow-by gases. The crankcase blow-by gases and other vapors present in the crankcase (for example, oil vapors) are hereinafter collectively referred to as crankcase vapors 34 and are schematically illustrated by black arrows 34 in FIG. 1.

In order to prevent the escape of air polluting emissions from the engine and to manage the crankcase vapors, the engine 10 utilizes a crankcase emission control system 36. The emission control system 36 includes a crankcase air outlet 38 connecting the crankcase 12 to the cylinder air intake system 20 at a location subject to variable intake vacuum pressures to allow the crankcase vapors to be drawn into the inlet air passing to the cylinders 14. The crankcase air outlet 38 may be disposed in an engine cover 40 such as a valve cover or cam cover. The crankcase vapors may be drawn into the cylinder air intake system 20 downstream of the throttle 32, or alternatively, in a non-throttled engine, they may be drawn in upstream of a supercharger or downstream of the inlet air filter 22.

In the embodiment shown in FIG. 1, the crankcase emission control system 36 is a positive crankcase ventilation (PCV) system including a crankcase air inlet 42 connected between the cylinder air intake system 20 and the crankcase 12. It should be understood, however, that the crankcase emission control system 36 may be any type of closed crankcase ventilation system. The crankcase air inlet 42 admits filtered air 44, schematically illustrated by light arrows in FIG. 1, from the cylinder air intake system 20 into the crankcase 12 to mix with crankcase vapors 34 present in the crankcase 12. The mixture 46 of air and crankcase vapors is schematically illustrated by dotted arrows in FIG. 1.

A hydrophobic, oleophobic membrane 48 covers the crankcase air outlet 38 and inhibits, and may even prevent, the passage of oil and liquid water out of the crankcase 12 through the crankcase air outlet 38. Air and crankcase vapors that have been filtered by the membrane 48 are schematically illustrated by dashed arrows 50 in FIG. 1. The membrane 48 may be made of a treated fabric-like material that is resistant to oil and water while also being air permeable to allow for airflow through the membrane. For example, the membrane 48 may be a modified acrylic copolymer cast on a thin, non-woven polyester support that is treated with an oleophobic/hydrophobic substance or a modified polyethersulfone polymer cast on a non-woven polyester support treated with an oleophobic/hydrophobic substance. Examples of such oleophobic/hydrophobic substances include fluoropolymers such as a fluorosulfone (e.g., polyfluorosulfone acrylate), a polyvinylidene fluoride, a polytetrafluoroethylene (PTFE), etc. Alternatively, the membrane 48 may be any material that has both hydrophobic and oleophobic properties.

The membrane 48 resists liquid oil, but allows oil vapor to pass through, inhibiting oil droplets entrained in the crankcase vapors from penetrating or passing through the membrane. This reduces the loss of engine oil through the emission control system 36. Oil entrained in the crankcase vapors that is allowed to pass into the cylinder air intake system 20 is burned in the combustion chambers 18. The membrane 48 thereby limits the loss of engine oil through burning in the combustion chambers 18.

The membrane 48 also resists liquid water, inhibiting liquid water from passing out of the crankcase 12 into the air of the air intake manifold 30. This reduces the possibility of throttle body icing due to the presence of water when the ambient temperatures are at or below freezing. The membrane 48, however, allows water vapor to pass, thereby providing for the ventilation of water from the crankcase back into the combustion chambers and out of the engine through the engine exhaust system.

The membrane 48 may be supported in the crankcase air outlet 38 by a housing such as one made of metal, plastic, or other suitable material. The membrane 48 may also be included as part of a crankcase ventilation fitting, such as a PCV fitting, that is disposed in the crankcase air outlet 38. Alternatively, the membrane 48 may be sandwiched between two existing parts in the emission control system 36. In yet another embodiment, the membrane 48 may have a three-dimensional configuration. The membrane 48 may be overmolded in plastic, such as a plastic with or without glass fill, to give shape and support to the membrane material. A molded plastic carrier may be used to shape the membrane 48 into a thimble-like shape that aids in the flow of oil and water off the membrane. The size and shape of the membrane 48, as well as the method of supporting and applying the membrane, depends on factors such as the flow requirements of the emission control system 36, availability of space in the emission control system, and thermal conditions in the emission control system.

Figure 2:
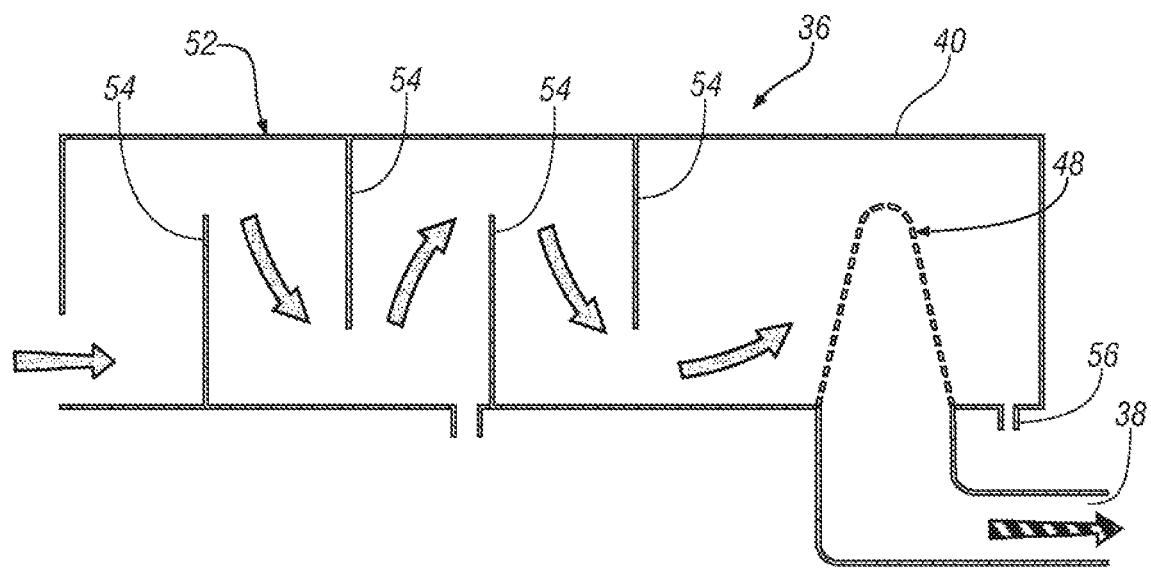
FIG. 2 is a schematic view of a hydrophobic, oleophobic membrane of the emission control system in combination with a labyrinth (impact) separator.
Figure 3:
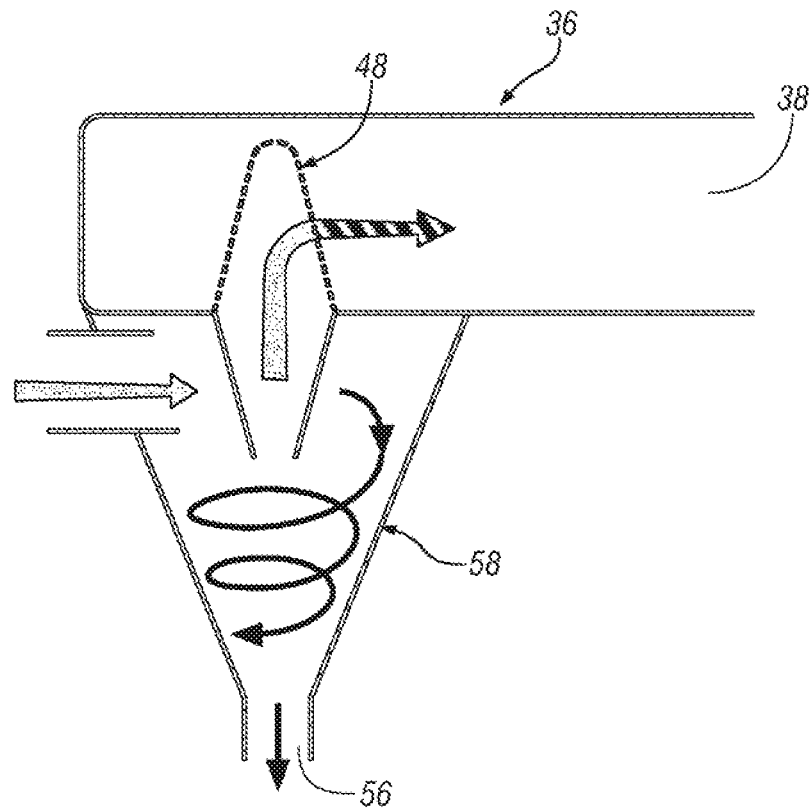
FIG. 3 is a schematic view of a hydrophobic, oleophobic membrane of the emission control system in combination with a cyclone chamber.

Turning to FIGS. 2 and 3, the emission control system 36 may further include a labyrinth (impact) separator 52 upstream of and adjacent the crankcase air outlet 38. For example, the labyrinth separator may be disposed in an engine cover 40. The labyrinth separator 52 is shown schematically in FIG. 2. The baffles 54 of the labyrinth separator 52 change the velocity and direction of crankcase vapors passing through the separator, causing entrained oil droplets to separate from the crankcase vapors. The emission control system 36 may also include at least one drain 56 for draining oil away from the membrane 48. Due to the three-dimensional, thimble shape of the membrane 48, oil that is accumulated on the outer surface of the membrane flows off the membrane and back into the crankcase 12 through the drain 56.

The emission control system 36 may alternatively include a cyclone chamber-type separator 58 upstream of and adjacent the crankcase air outlet 38. The cyclone chamber 58 may also be disposed in the engine cover 40. The cyclone chamber 58 is shown schematically in FIG. 3. The cyclonic motion of the crankcase vapors in the cyclone chamber 58 cause the entrained oil droplets to separate from the crankcase vapors. The labyrinth separator 52 or cyclone chamber separator 58 operates in conjunction with the membrane 48 to remove oil droplets and water droplets from the crankcase vapors.

The membrane 48, however, is alone capable of removing oil droplets and water droplets from the crankcase vapors, without the use of a conventional separator such as the labyrinth separator 52 or cyclone chamber 58. The elimination of a conventional separator from the emission control system 36 may allow for reduction of the volume needed for the emission control system and therefore reduction of the height of the engine covers 40. A reduction of the height of the engine covers 40 in turn can allow for lower vehicle hoodlines.

Optionally, a hydrophobic, oleophobic membrane 60 may cover the crankcase air inlet 42 or otherwise may be disposed in the cylinder air intake system 20 upstream of the throttle 32 or intake manifold 30. The membrane 60 inhibits oil from escaping into the fresh air intake system 20 during backflow conditions wherein crankcase vapors are forced back into the fresh air intake system 20 through the crankcase air inlet 42. This would further prevent the loss of engine oil from the crankcase 12.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. An engine crankcase emission control system for an internal combustion engine, the system comprising:

a cylinder air intake system connected to associated engine cylinders;

an engine crankcase;

a crankcase air outlet connecting the crankcase to the cylinder air intake system at a location downstream of an air filter so as to be subject to variable intake vacuum pressures to allow crankcase vapors to be drawn into inlet air passing to the cylinders; and a hydrophobic, oleophobic membrane covering the crankcase air outlet, the membrane inhibiting the passage of liquid oil and water out of the crankcase through the crankcase air outlet, wherein the membrane is supported in the crankcase air outlet by a housing which is directly attached to an engine cover.

2. The engine crankcase emission control system of claim 1 wherein the crankcase air outlet is connected with the air intake system downstream of a throttle.

3. The engine crankcase emission control system of claim 1 wherein the membrane has a three-dimensional configuration.

4. The engine crankcase emission control system of claim 1 wherein the membrane is thimble-shaped.

5. The engine crankcase emission control system of claim 1 including a crankcase ventilation fitting in the crankcase air outlet, the membrane being integral with the crankcase ventilation fitting.

6. The engine crankcase emission control system of claim 1 including a crankcase air inlet downstream of an engine air intake filter for admitting air into the crankcase to mix with the crankcase vapors, and a second hydrophobic, oleophobic membrane in the crankcase air inlet and preventing liquid oil backflow from the crankcase into the fresh air intake system.

7. The engine crankcase emission control system of claim 1 including a labyrinth separator upstream of the crankcase air outlet.

8. The engine crankcase emission control system of claim 1 including a cyclone chamber upstream of the crankcase air outlet.

9. The engine crankcase emission control system of claim 1 wherein the crankcase air outlet is disposed in a valve cover of the engine.

10. The engine crankcase emission control system of claim 1 including a drain for draining oil away from the membrane.

11. An internal combustion engine comprising:

a crankcase and at least one cylinder;

a cylinder air intake system in fluid communication with each cylinder;

a crankcase air outlet connecting the crankcase to the cylinder air intake system at a location downstream of an air filter to allow crankcase vapors to be drawn into the inlet air passing to the cylinders; and a hydrophobic, oleophobic membrane covering the crankcase air outlet, the membrane inhibiting the passage of liquid oil and water out of the crankcase through the crankcase air outlet wherein the membrane is supported in the crankcase air outlet by a housing which is directly attached to an engine cover.

12. The engine of claim 11 wherein the the crankcase air outlet is connected with the air intake system downstream of a throttle.

13. The engine of claim 11 wherein the membrane has a three-dimensional configuration.

14. The engine of claim 11 including a crankcase ventilation fitting in the crankcase air outlet, the membrane being integral with the crankcase ventilation fitting.

15. The engine of claim 11 including a labyrinth separator upstream of the crankcase air outlet.

16. The engine of claim 11 including a cyclone chamber upstream of the crankcase air outlet.

17. The engine of claim 11 including a crankcase air inlet downstream of an engine air intake filter for admitting air into the crankcase to mix with the crankcase vapors and a second hydrophobic, oleophobic membrane in the crankcase air inlet and preventing liquid oil backflow from the crankcase into the fresh air intake system.

18. The engine of claim 11 including an engine valve cover, the crankcase air outlet being disposed in the valve cover.

* * * * *